United States Patent
Huntley

[11] Patent Number: 5,671,556
[45] Date of Patent: Sep. 30, 1997

[54] EXTRUDED LICENSE PLATE MOUNTING BRACKET FOR MULTIPLE LICENSE PLATES

[75] Inventor: Robert I. Huntley, Denton, Tex.

[73] Assignee: Paccar Inc., Bellevue, Wash.

[21] Appl. No.: 768,789

[22] Filed: Dec. 18, 1996

Related U.S. Application Data

[63] Continuation of Ser. No. 653,826, May 28, 1996, abandoned, which is a continuation of Ser. No. 341,394, Nov. 17, 1994, abandoned.

[51] Int. Cl.$^6$ ........................................ G09F 7/10
[52] U.S. Cl. .......................... 40/200; 40/643; 403/110
[58] Field of Search ................................ 40/200, 210, 643; 211/94, 162; 411/84, 85, 104; 403/83, 110

[56] References Cited

U.S. PATENT DOCUMENTS

| | | | |
|---|---|---|---|
| 1,360,880 | 11/1920 | Buchholtz | 40/200 |
| 2,177,215 | 10/1939 | Hodgkinson | 40/200 |
| 2,575,594 | 11/1951 | Reiner | 411/85 |
| 2,579,537 | 12/1951 | Berlekamp | 40/210 |
| 3,908,296 | 9/1975 | Harrison | 40/210 |
| 4,753,354 | 6/1988 | Patterson et al. | 403/110 X |
| 4,805,784 | 2/1989 | Solheim et al. | 211/94 |
| 4,903,928 | 2/1990 | Shell | 248/225.1 |
| 5,244,193 | 9/1993 | Hehr | 411/84 |
| 5,255,956 | 10/1993 | Stevens. | |

Primary Examiner—Joanne Silbermann
Attorney, Agent, or Firm—Flehr Hohbach Test Albritton & Herbert LLP

[57] ABSTRACT

A license plate mounting bracket (10) for mounting of at least one license plate (11) thereto including an elongated frame member (12) providing a mounting surface (13) formed for supportably seating the license plate (11) thereon. The frame member (12) includes a mounting groove (16) formed in the mounting surface (13) which is dimensioned for sliding receipt of an enlarged head (17) of a releasable fastener (15). This sliding receipt enables sliding movement along the groove (16) at a plurality of positions when the fastener (15) is released relative to the mounting surface (13). Further, the groove (16) is formed to secure the head (17) of the fastener (15) in a manner enabling tightening of the fastener (15) at the plurality of positions to secure the license plate (11) to the mounting surface (13) at a desired location therealong.

20 Claims, 3 Drawing Sheets

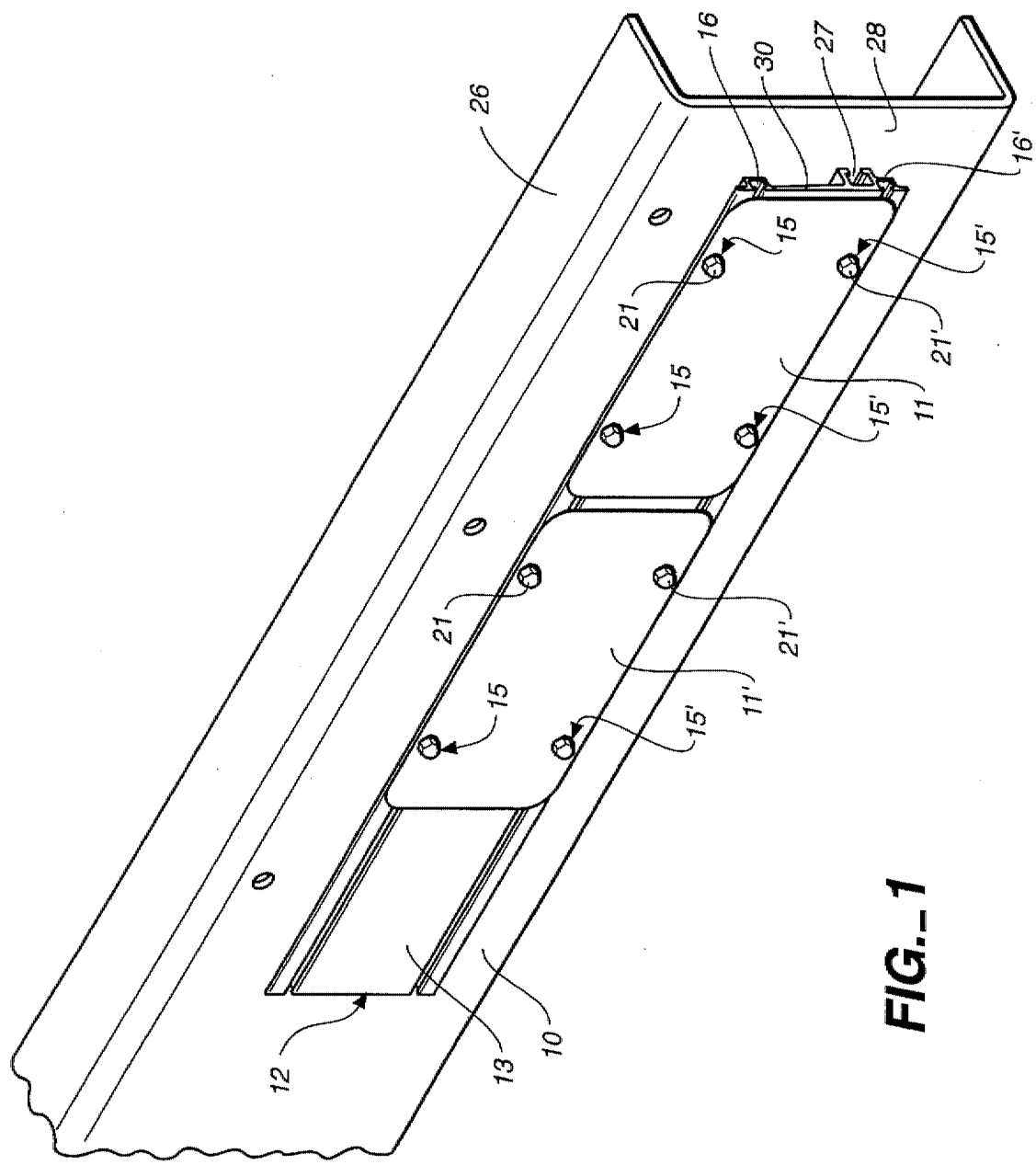
FIG._1

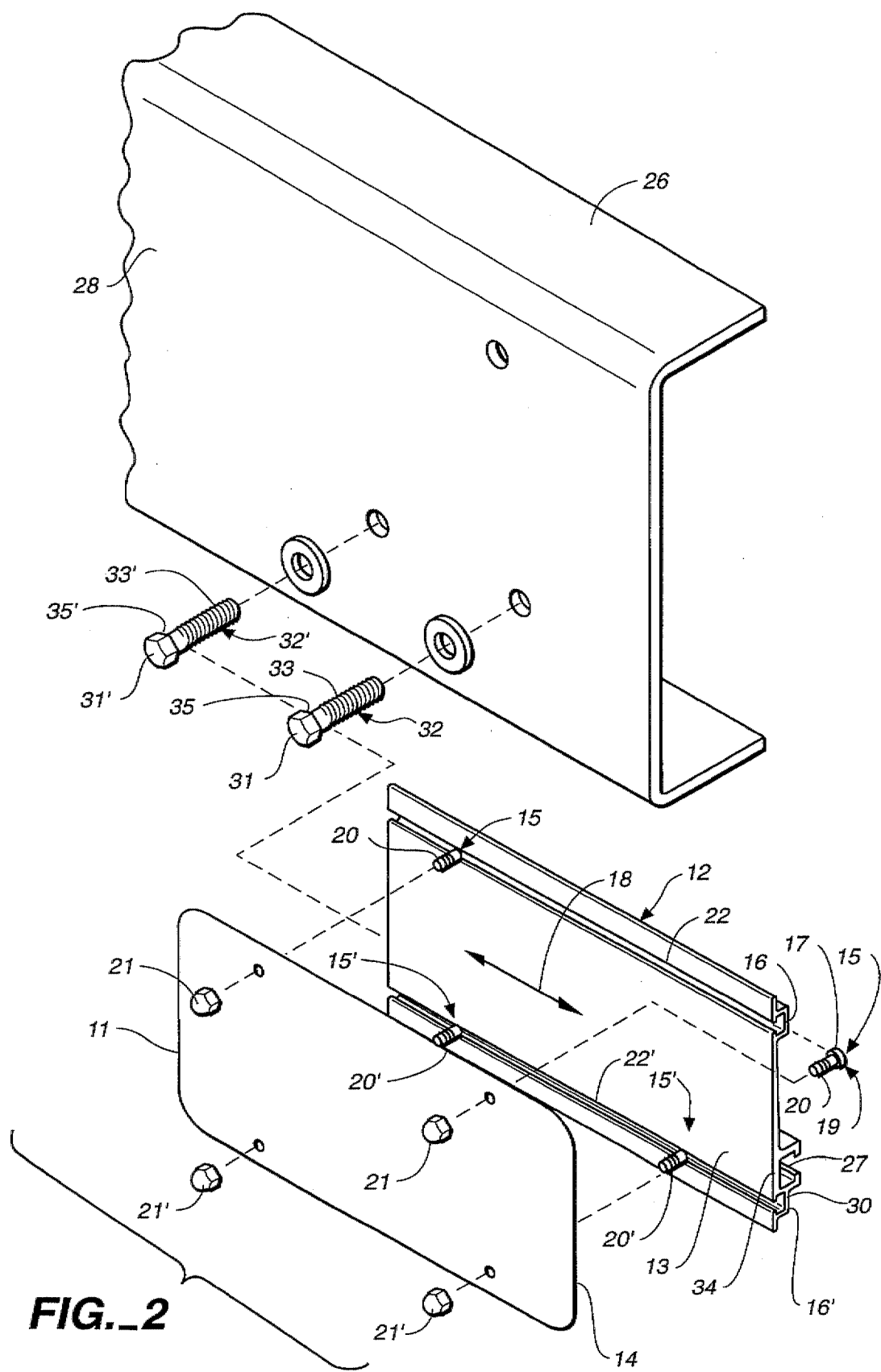
FIG._2

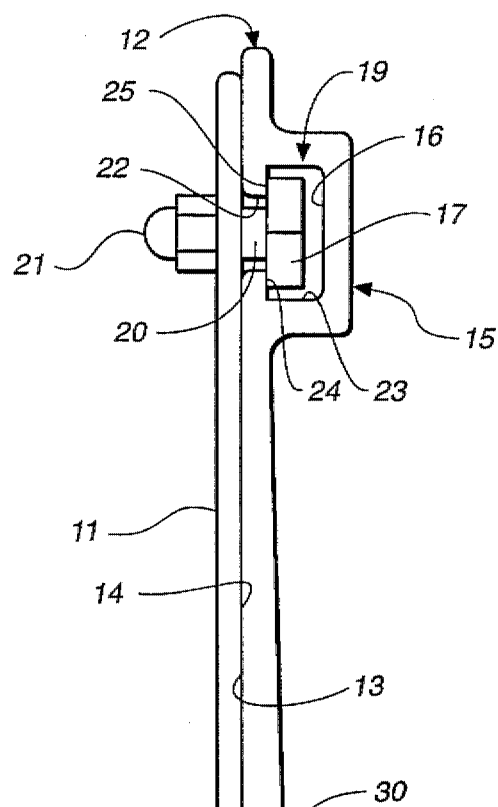
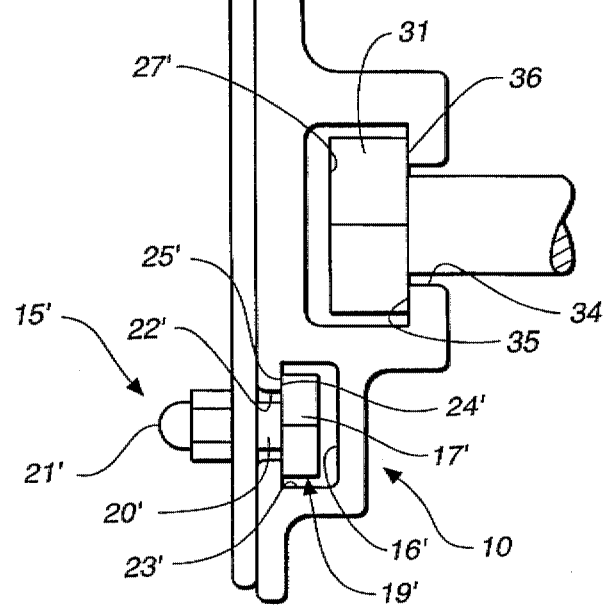
FIG._3

EXTRUDED LICENSE PLATE MOUNTING BRACKET FOR MULTIPLE LICENSE PLATES

This is a continuation of application Ser. No. 08/653,826, filed May 28, 1996, now abandoned, which was a continuation of application Ser. No. 08/341,394 filed Nov. 17, 1994, now abandoned.

TECHNICAL FIELD

The present invention relates, generally, to license plate holders and, more particularly, to license plate holders for multiple license plates.

BACKGROUND ART

Typically, license plate holders are provided by bracket members having protruding bolts or holes aligned in a standard license plate bolt pattern to enable mounting of a single license plate thereon. These license plate holders are generally formed for mounting to a predetermined location on a bumper or other panel at the front and/or rear of the vehicle.

Large semi-trucks or class eight trucks, however, often require multiple license plates, depending upon the states of common travel. Periodically, new license plates are added which require the mounting of new license plate holders and associated hardware for the new license plate. Each new plate and the corresponding mounting bracket are generally strategically mounted to the bumper at a position where neither the license plate nor the mounting bracket will cover or impede any important bumper components. Consequently, this partially random placement often results in an aesthetically displeasing appearance. Moreover, to mount the license plate brackets to the bumper usually requires proper alignment and the drilling of new holes in the bumper. Hence, the task of removing and/or adding license plate brackets and license plates can become considerably laborious and time consuming.

DISCLOSURE OF INVENTION

Accordingly, it is an object of the present invention to provide a license plate mounting bracket for a vehicle which simplifies mounting of a license plate.

Another object of the present invention is to provide a license plate mounting bracket which enables mounting of multiple license plates to a single bracket.

It is another object of the present invention to provide a license plate mounting bracket which can be mounted to a plurality of locations on a vehicle.

Still another object of the present invention is to provide a license plate mounting bracket which facilitates mounting to the vehicle.

Yet another object of the present invention is to provide a license plate mounting bracket which is simple and economical to manufacture.

It is a further object of the present invention to provide a license plate mounting bracket for a vehicle which is durable, compact, easy to maintain, has a minimum number of components, and is easy to use by unskilled personnel.

The present invention includes a license plate mounting bracket for mounting of at least one license plate thereto. Briefly, the bracket includes an elongated frame member providing a mounting surface formed for supportably seating a frame engaging surface of the license plate thereon. At least one releasable fastener is included coupling the license plate to the frame member mounting surface. The frame member includes a mounting groove formed in the mounting surface which is dimensioned for sliding receipt of an enlarged head of the fastener. This sliding receipt enables sliding movement along the groove at a plurality of positions when the fastener is released relative to the mounting surface. Further, the groove is formed to secure the head of the fastener in a manner enabling tightening of the fastener at the plurality of positions to secure the license plate to the mounting surface at a desired location therealong.

In another aspect of the present invention, since the frame member has a generally constant transverse cross-sectional dimension, suitable fabrication thereof may provided by a metallic or a thermo-plastic extrusion. This simplifies manufacture while further enabling varying lengths of the frame member for multiple license plate mountings to a single mounting bracket.

BRIEF DESCRIPTION OF THE DRAWING

The assembly of the present invention has other objects and features of advantage which will be more readily apparent from the following description of the Best Mode of Carrying Out the Invention and the appended claims, when taken in conjunction with the accompanying drawing, in which:

FIG. 1 is top perspective view of a license mounting bracket for a vehicle constructed in accordance with the present invention.

FIG. 2 is an enlarged, exploded, fragmentary, top perspective view of the license mounting bracket of FIG. 1.

FIG. 3 is an enlarged side elevation view of the license mounting bracket of FIG. 1 having a license plate mounted thereto.

BEST MODE OF CARRYING OUT THE INVENTION

The following description is presented to enable a person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded with the widest scope consistent with the principles and features disclosed herein. It will be noted here that for a better understanding, like components are designated by like reference numerals throughout the various figures.

Attention is now directed to FIGS. 1 and 2, where the license plate mounting bracket, generally designated 10, is illustrated for mounting of a license plate 11 to the bracket. Briefly, an elongated frame member 12 is included providing a mounting surface 13 formed for supportably seating a frame engaging surface 14 of license plate 11 thereon. At least one releasable fastener 15 couples license plate 11 to the frame member mounting surface 13. Mounting bracket 10 of the present invention further includes a mounting groove, generally designated 16, defined by mounting surface 13. The mounting groove is formed and dimensioned to receive an enlarged head 17 of fastener 15 for sliding movement along groove 16 through a plurality of positions when fastener 15 is released relative to mounting surface 13. Further, mounting groove 16 is formed to secure enlarged head 17 of fastener 15 in a manner enabling tightening of fastener 15 at the plurality of positions to secure license plate 11 to mounting surface 13 at a desired location therealong.

Accordingly, the present invention enables simplified mounting of a license plate, or multiple license plates, to a vehicle bumper or panel by providing a license plate mounting bracket suitable for mounting at a plurality of positions along the bumper or panel. The license plate can then be mounted the mounting bracket at a plurality of positions along the bracket by selectively sliding the enlarged head of a fastener along the mounting groove. This groove further precludes rotation of the head to enable tightening thereagainst.

It will be appreciated that the perimeter dimension of frame member 12 can be virtually any geometric shape. In the preferred embodiment, however, frame member 12 is generally a rectangular shaped plate having a planar mounting surface 13. Further, the frame member is preferably formed from a generally rigid, extruded, material such as metal, plastic or the like, as will be discussed.

In accordance with the present invention, mounting bracket 10 preferably provides two spaced-apart mounting grooves 16, 16' extending generally parallel one another and longitudinally along frame member 12. Mounting grooves 16 and 16' are preferably spaced-apart by a distance substantially equal to that of a conventional bolt pattern of a standard license plate (FIG. 2). Hence, fastener heads 17, 17', which are slidably received in respective grooves 16, 16', can move longitudinally along the grooves in the directions of arrows 18. This arrangement not only permits securement of license plate 11 to frame member 12 at four spaced locations, but also enables longitudinal repositioning of the license plate relative to the frame member. Therefore, mounting or movement of the license plate can be executed in a simple, non-time consuming manner.

While the two spaced-apart mounting grooves of the present invention provide increased mounting stability to the license plate, it will be appreciated that only one groove may be necessary for proper operation and mounting to the frame member.

For the ease of description, and since both mounting grooves 16 and 16' are essentially identical, only one mounting groove 16 will be described hereinafter. Briefly, each fastener 15 is preferably provided by a convention bolt 19, having an enlarged hexagonal head 17 and a threaded shaft portion 20, and a tightening nut 21.

FIG. 3 illustrates that a transverse cross-section of mounting groove 16 is substantially T-shaped having an enlarged area formed for mating receipt of opposed sides of hexagonal-head 17, and a neck portion 22 thereof formed for sliding receipt of the bolt shaft 20. Because of the generally small tolerance between the opposing groove walls 23 of mounting groove 16 and the opposed sides of hexagonal head 17, rotational motion of bolt 20 relative groove 16 is precluded. Nut 21 of the fastener, therefore, may be turned relative to corresponding bolt 19 to tighten the fastener without rotating or having to hold bolt 19.

While four fasteners 15, 15' are preferable, the present invention may function properly using only two fasteners situated in either the same groove or the two opposing spaced-apart grooves.

After license plate 11 has been positioned along frame member 12, fasteners 15 are tightened, via nut 21, to secure the frame engaging surface 14 of license plate 11 against mounting surface 13 of frame member 12. As nut 21 is tightened, a bottom lip portion 24 of hexagonal head 17 (FIG. 3) engages against a wall or shoulder 25 partially defining mounting groove 16. Hence, fastener 15 causes license plate 11 to be pulled against mounting surface 13 for frictional engagement therebetween.

In accordance with the present invention, frame member 12 is capable of mounting multiple licenses plates to a single mounting bracket 10. FIG. 1 illustrates that depending upon the longitudinal length of frame member 12, multiple license plates 11, 11' can be accommodated in a side-by-side manner simply by loosening nuts 21, 21' and sliding fasteners 15, 15' longitudinally along grooves 16, 16'. Accordingly, when new license plates are be added, a new mounting bracket may not be required. Further, replacement or removal of an existing license plate is easily accomplished by simply loosening the nuts 21, 21' of the fasteners, and sliding the license plate and the attached loosened fasteners along the mounting grooves as a unit. Similarly, to mount the license plate, the fasteners can be loosely pre-mounted thereto whereby the hexagonal head can be easily inserted into and slid along the mounting grooves to the proper position. The license plate can then be simply and efficiently affixed in place by tightening the corresponding nuts.

To releasably couple mounting bracket 10 to an exterior surface 28 of a mounting member 26, such as a vehicle panel or bumper, a backside supporting surface 30 of frame member 12, positioned opposite frame engaging surface 14, provides a mounting slot 27 extending longitudinally along frame member 12 preferably substantially parallel to mounting grooves 16, 16'. Similar to the mounting grooves, mounting slot 27 is formed and dimensioned to receive an enlarged head 31 of a bumper mounting bolt 32 for sliding movement longitudinally along the mounting slot. Accordingly, the frame member may be mounted to bumper 26 at a plurality of positions (FIGS. 1 and 2) by sliding the enlarged head 31 of a bumper mounting bolt 32 relative mounting slot 27.

Two bumper mounting bolts 32, 32' (FIG. 2) are preferably provided, each of which includes an enlarged hexagonal head 31 and a threaded shaft 33. FIG. 3 illustrates that a transverse cross-section of mounting slot 27 is substantially T-shaped having an enlarged area formed for mating receipt of opposed sides of hexagonal-head 31, and a neck portion 34 formed for sliding receipt the bolt shaft 33. Similar to the mounting grooves, the dimensions of the mounting slot preclude rotational motion of bolt 32 relative slot 27. Accordingly, a mating nut (not shown) positioned at a backside of bumper 26 may be turned relative to bumper mounting bolt 32 without rotating or having to hold bolt 32.

Again, similar to mounting grooves 16, 16', after frame member 12 has been positioned relative bumper 26 (i.e., sliding movement of hexagonal-head 31 relative mounting slot 27), the tightening nut is threadably tightened to mounting bolt 32 to secure the frame member to the bumper. A bottom lip portion 35 of hexagonal head 31 engages against a shoulder portion 36 partially defining mounting slot 27 which pulls the frame member into frictional engagement with bumper 26.

It will be appreciated that while only one mounting slot 27 is provided for mounting stability, two or more spaced-apart mounting slots could be included without departing from the true spirit and nature of the present invention.

In another aspect of the present invention, frame member 12 of mounting bracket 10 can be formed through extrusion molding techniques. Since the transverse cross-sectional dimension of frame member 12, as shown in FIG. 3, is substantially constant along the longitudinal direction thereof, fabrication through a metallic or a thermo-plastic extrusion can be accomplished. This extrusion technique is more cost effective and fabrication efficient than the prior art techniques of cast or injection molding. Moreover, longitudinal length of the frame member extrusion, depending upon the desired number multiple license plates to be mounted thereon, is easily varied.

What is claimed is:

1. A license plate mounting bracket for slidable mounting a plurality of license plates in a side-by-side relation comprising:

an elongated frame member having a uniform transverse cross-section and a length sufficient for mounting more than one license plate in a side-by-side relation therein, said frame member providing a mounting surface formed for supportably seating a frame engaging surface of said at least one license plate thereon said elongated frame member further having a backside supporting surface positioned opposite said frame engaging surface, said backside supporting surface having a mounting apparatus protruding rearwardly therefrom adapted to connect said elongated frame member to a bumper; and a mounting groove defined by said mounting surface and extending continuously from one end of said frame member to substantially an opposite end thereof, and formed and dimensioned to receive an enlarged head of a fastener with said fastener oriented to extend forwardly of said mounting surface for sliding movement of said fastener along said groove through a plurality of positions when said fastener is released relative to said mounting surface, and said groove being formed to secure said head of said fastener in a manner enabling tightening of said fastener at said plurality of positions to secure said license plate to said mounting surface at a desired location therealong.

2. The bracket as defined in claim 1 wherein, said groove is formed inwardly of said frame engaging surface; and said groove is formed to prevent rotation of said head of said fastener.

3. The bracket as defined in claim 2 wherein, said mounting groove has a substantially T-shaped cross section and includes a wall facing away from said engaging surface and formed to engage said head of said fastener when said fastener means is tightened relative to said mounting surface.

4. The bracket as defined in claim 3 wherein, said mounting groove extends over the length dimension of said frame engaging surface.

5. The bracket as defined in claim 3 wherein, said mounting groove is substantially linear.

6. The bracket as defined in claim 5 wherein, a transverse cross section of said mounting groove is substantially rectangular.

7. The bracket as defined in claim 3 wherein, said mounting surface is generally planar.

8. The bracket as defined in claim 1 further including:

a second mounting groove defined by said mounting surface and spaced-apart from the first named mounting groove, and formed and dimensioned to receive an enlarged head of a second fastener for sliding movement along said second mounting groove through a plurality of positions when said second fastener is released relative to said mounting surface, and said second mounting groove being formed to secure said head of said second fastener in a manner enabling tightening of said second fastener at said plurality of positions to secure said license plate to said mounting surface at a desired location therealong.

9. The bracket as defined in claim 8 wherein, said first named groove and said second mounting groove are formed inwardly of said frame engaging surface, and each is formed to prevent rotation of the head of the respective fastener.

10. The bracket as defined in claim 9 wherein, each said first named groove and said second mounting groove has a substantially T-shaped cross section and includes a wall facing away from said engaging surface and formed to engage the head of the respective fastener when the respective fastener is tightened relative to said mounting surface.

11. The bracket as defined in claim 10 wherein, said first named groove and said second mounting groove each extend substantially parallel one another and over the length dimension of said frame engaging surface.

12. The bracket as defined in claim 8 further including:

at least one releasable bolt member coupling said frame member to an exterior surface of a mounting member; and a mounting slot defined by a supporting surface of said frame member, positioned opposite said engaging surface, said mounting slot being formed and dimensioned to receive an enlarged head of said bolt member for sliding movement along said slot through a plurality of positions when said bolt member is released relative to said supporting surface, and said slot being formed to secure said head of said bolt member in a manner enabling tightening of said bolt member at said plurality of positions to secure said frame member to said exterior surface at a desired location therealong.

13. The bracket as defined in claim 1 wherein, said frame member has a substantially uniform transverse cross-sectional dimension from said one end to said opposite end thereof so as to be suitable for forming as an extrusion.

14. The bracket as defined in claim 13 wherein, said frame member is composed of a thermo-plastic extrusion.

15. The bracket as defined in claim 13 wherein, said frame member is composed of a metallic extrusion.

16. The bracket as defined in claim 1 further including:

at least one releasable bolt member coupling said frame member to an exterior surface of a mounting member; and a mounting slot defined by a supporting surface of said frame member, positioned opposite said engaging surface, said mounting slot being formed and dimensioned to receive an enlarged head of said bolt member for sliding movement along said slot through a plurality of positions when said bolt member is released relative to said supporting surface, and said slot being formed to secure said head of said bolt member in a manner enabling tightening of said bolt member at said plurality of positions to secure said frame member to said exterior surface at a desired location therealong.

17. The bracket as defined in claim 16 wherein, said slot is formed to prevent rotation of said head of said bolt member.

18. The bracket as defined in claim 17 wherein, said slot has a substantially T-shaped cross section and includes a wall facing away from said exterior surface and formed to engage said head of said bolt member when said bolt member is tightened relative to said supporting surface.

19. The bracket as defined in claim 18 wherein, said slot extends linearly over the length dimension of said supporting surface.

20. The license plate mounting bracket of claim 1 wherein, said mounting apparatus comprises a mounting slot running along the length of said elongated frame member.

* * * * *